Aug. 17, 1926. 1,596,714
L. W. BUGBEE
PROCESS OF MAKING BIFOCAL LENSES
Filed Jan. 29, 1924
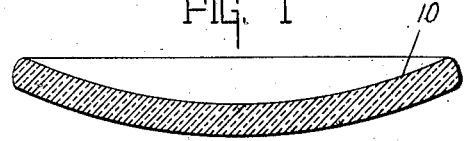
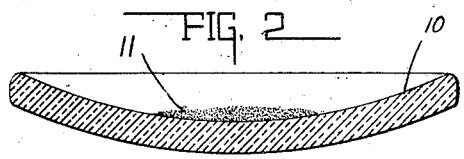
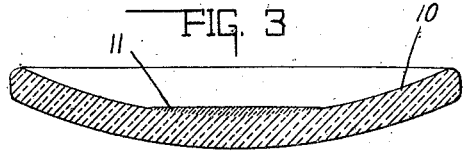
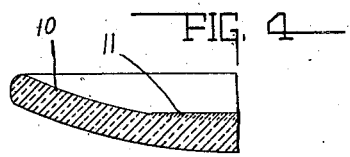
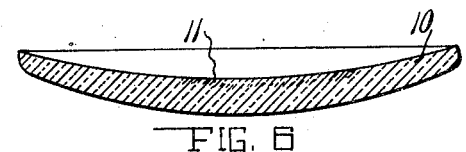
INVENTOR.
LUCIAN W. BUGBEE.
BY
ATTORNEYS.

Patented Aug. 17, 1926.

1,596,714

UNITED STATES PATENT OFFICE.

LUCIAN W. BUGBEE, OF INDIANAPOLIS, INDIANA, ASSIGNOR TO FRANKLIN OPTICAL COMPANY, OF INDIANAPOLIS, INDIANA, A CORPORATION.

PROCESS OF MAKING BIFOCAL LENSES.

Application filed January 29, 1924. Serial No. 689,238.

The object of this invention is to improve the process of making fused bifocal lenses of the type wherein the focal powers of the different fields of the lens are determined chiefly by the refractory index of the glass forming the same.

Heretofore, fused lenses of the Kryptok type have been made by first forming the major portion of crown glass and then grinding a recess in the same to receive the flint glass for forming the reading segment and after the recess was filled with flint glass, the same was fused and then the surfaces were finished as in single vision lenses.

The chief feature of this invention is to make a fused bifocal lens of similar character to the Kryptok lens, without forming a recess in the major portion of the lens to receive the flint glass or glass of higher refractory index. In this invention after the major lens has been formed concavo-convex with a uniform curvature throughout, the flint glass is placed in the concave side without recessing the same and then fused and thereafter the curvatures of the two sides of the blank are ground to the desired prescription, but said curvatures in this lens are essentially different from the corresponding curvatures heretofore ground in similar fused or Kryptok lenses, as will hereafter appear. The final curvature on the concave side is appreciably less than the original curvature, thus grinding the major lens near the margin thereof much more than near the flint glass, whereby a sufficient layer of flint glass remains to form the near field and give the desired power.

The full nature of the invention will be understood from the accompanying drawings and the following description and claims:

In the drawings, Figure 1 is a central section through a major lens blank formed of crown glass or other glass of relatively low refractory index. Fig. 2 is a section similar to Fig. 1 with nodules of flint glass or glass of a relative high refractory index placed in the concave side of the major lens. Fig. 3 is the same as Fig. 2 after it has been fused. Fig. 4 is the same as Fig. 3 with the upper surface finally ground. Fig. 5 is the same as Fig. 4 with a part broken away to form the blank for one lens. Fig. 6 shows the finished lens.

The first step in this process is to make a major lens blank 10 concavo convex and in the preferable form of this process it is what has come to be known as a target blank, that is, a blank large enough, by splitting it, to form two lens blanks and make two lenses, but the invention is not limited to the use of target blanks.

The second step in the process of making fused lenses of the Kryptok type heretofore has been to grind a special recess, not here shown, in the concave side of the lens, to receive the flint glass and form the reading segment. But with the process constituting this invention it becomes unnecessary to grind said recess and instead the flint glass 11 or glass of a higher index of refraction is placed in the concave side of the major lens blank 10, the curvature of which is uniform, and when a target blank is used, in the middle thereof as shown in Fig. 2. The flint glass is preferably in the shape of nodules or individual bead-like form before being fused.

The second step of the process consists in fusing the two kinds of glass together, which may be done in the same manner as heretofore done in fused bifocal lenses of the Kryptok type. This fusing produces a blank as shown in Fig. 3, wherein the major lens blank remains of uniform thickness throughout, and the flint glass portion is superimposed thereon but fused therewith.

The next step of the process consists in grinding the concave side of the target blank after the fusing, with a tool having a curvature different from the original curvature, of less curvature than the original, say, minus six diopter, as in Fig. 4 substantially, instead of nine diopter as in Fig. 1, in order to finish the same and leave a layer of the flint glass sufficient to constitute the near field and have the desired power. In this step in the process, the major lens is therefore ground near its margin much more than near the flint glass.

The next step in the process consists in splitting the target blank shown in Fig. 4, so as to produce the single lens blank like that shown in Fig. 5.

In the final step the convex side is ground to the desired curvature so as produce the desired focal powers, as shown in Fig. 6 but it is not necessary that the convex side should be surfaced before the concave side.

An essential distinction between the process here employed and that employed in making fused lenses of the Kryptok type heretofore is in the final surfacing of the lens. In making fused lenses of the Kryptok type the finished surface on the concave side of the lens may be substantially the same as the base curve of the original major lens blank. If that be minus six diopter, the finished surface on the concave side of the lens may be approximately minus six diopter, and in making the fused lenses of the Kryptok type, it is customary to vary the curvature on the convex side in order to obtain the desired focal powers rather than vary the curvature on the concave side.

In carrying out the process constituting this invention, the base curve of the major lens blank 10 on the concave side may be minus nine diopter, but the finished surface of the lens on the concave side must and will be less than minus nine diopter, say, minus six diopter substantially, as is noted by comparing Figs. 3 and 4. Instead of grinding both the crown and the flint glass portions of the blank substantially equal on the concave side as heretofore in making fused bifocal lenses of the Kryptok type, in the process constituting this invention the major lens portion is ground more than the minor lens portion, as shown. This also changes the curvature on the convex side and while in the fused lens of the Kryptok type, the surfacing on the convex side is modified to suit the prescription in order to obtain the desired focal powers, that result in this process is accomplished chiefly in grinding the concave side. Hence, this process includes a number of essential distinctions and differences from the process employed in making fused bifocal lenses of the Kryptok type as heretofore.

This process is cheaper than the former process mentioned and especially so when the target blanks are employed, although it is understood that this invention is not limited to the employment of target blanks, for the flint glass portion may be fused with the crown glass portion at a point other than the center and in that case the blank is not split, but the blank is smaller than a target blank and produces only one lens, being in that respect substantially the same as the blank in the process heretofore employed in making fused bifocal lenses of the Kryptok type.

It is understood that the ultimate focal powers of the reading and distance fields are due to both the differences in the indices of refraction of the two kinds of glass and also the curvatures of the surfaces thereof, but both fields have the same curvatures.

The invention claimed is:

1. The process of making fused bifocal lenses, which process includes forming a concavo convex major lens blank large enough to make a plurality of lenses and the concave side having uniform curvature throughout, afterwards fusing on the central portion of the concave side of said blank glass in nodule form of a different index of refraction from that of the major lens blank, dividing the lens blank into a plurality of individual lens blanks, and grinding the concave side of the individual lens blanks so as to leave a layer of said fused glass and give to the lens the desired bifocal powers.

2. The process of making fused bifocal lenses, which process includes forming a concavo convex major lens blank large enough to make a plurality of lenses and the concave side having uniform curvature throughout, afterwards fusing on the central portion of the concave side of said blank glass in nodule form and of a different index of refraction from that of the major lens blank, dividing the lens blank into a plurality of individual lens blanks, and surfacing the concave side of the individual lens blank so as to reduce the curvature thereof and leave a layer of the fused glass thereon so as to give to the finished lens the desired bifocal powers.

3. The process of making fused bifocal lenses, which process includes forming a concavo convex major lens blank large enough to make a plurality of lenses and the concave side having uniform curvature throughout, afterwards fusing on the central portion of the concave side of said blank glass in nodule form and of a different index of refraction from that of the major lens blank, dividing the lens blank into a plurality of individual lens blanks, and surfacing the convex side so that the curvatures of the two sides in addition to the refractory character of the glass will give the desired bifocal powers.

In witness whereof, I have hereunto affixed my signature.

LUCIAN W. BUGBEE.